UNITED STATES PATENT OFFICE.

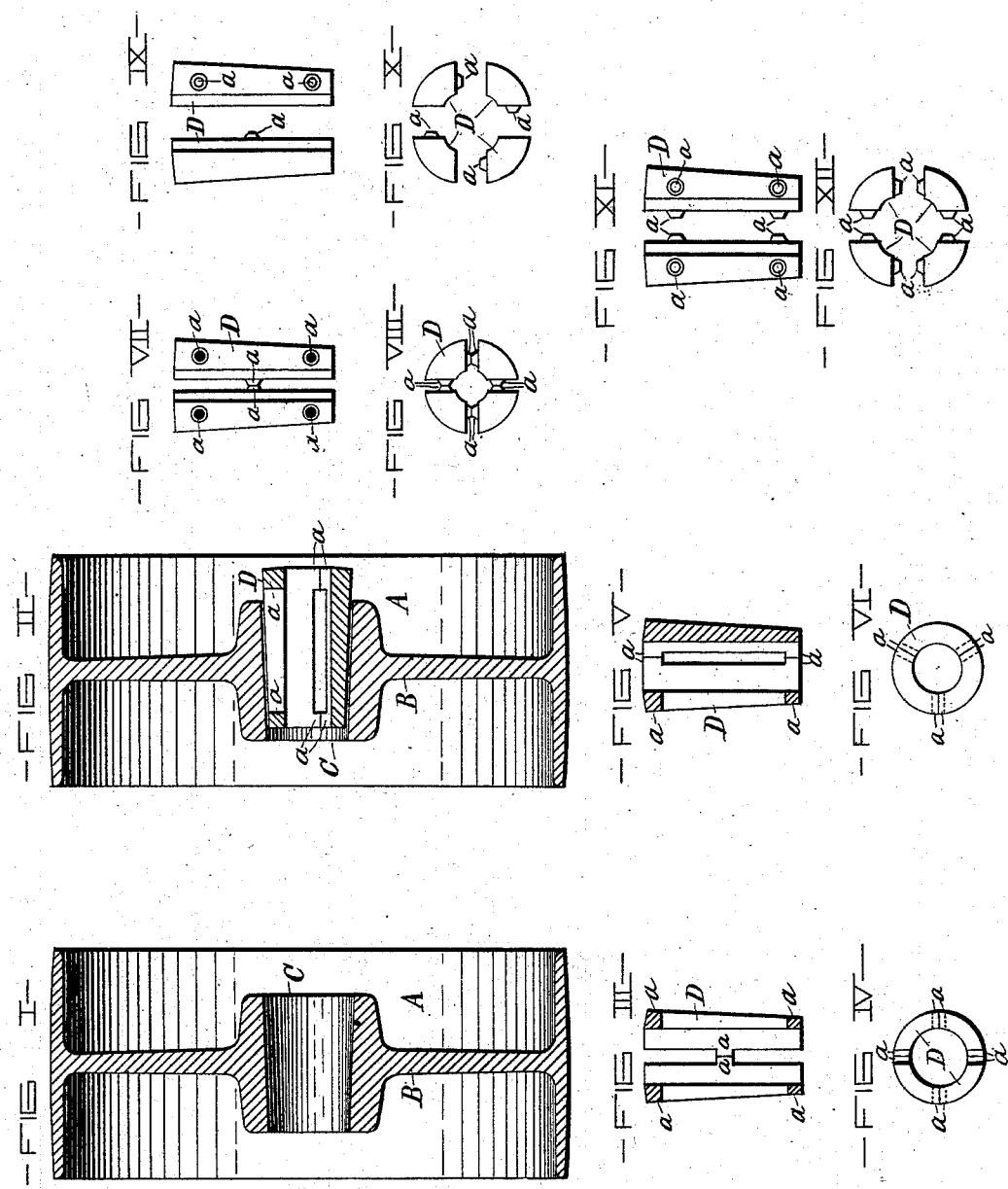

JOHN WALKER, OF CLEVELAND, OHIO.

PULLEY-WHEEL.

SPECIFICATION forming part of Letters Patent No. 288,386, dated November 13, 1883.

Application filed April 17, 1883. (No model.)

*To all whom it may concern:*

Be it known that I, JOHN WALKER, of the city of Cleveland, in the county of Cuyahoga and State of Ohio, have invented certain Improvements in Pulleys, Wheels, &c., of which the following is a specification.

The object of this invention is to admit of pulleys and wheels of various kinds being kept in stock in such condition as will allow of their being easily and readily adapted to fit shafting of different sizes.

In carrying out my invention pulleys of the same diameter, or approximating to a common diameter, are cast with a smooth, tapering central hole, into which any one of a number of iron bushes, differing in internal diameter, can be forced, a bush having a hole nearest in size to that required being selected for the purpose. The inserted bush is afterward bored to the proper size. To admit of the bush being driven firmly into the hub of the pulley or wheel, and secured therein without the aid of keys or set-screws, the said bush is made slightly compressible diametrically in the following manner: The bush is cored longitudinally, so as to consist of two or more sections, united by junction-pieces having such limited cross-section as to be elastic to some extent, or susceptible of compression, as force is applied to the exterior of the bush in the act of driving. It is not intended to subject the bush to such strain as will crush or disintegrate the substance of the junction-pieces, but only to compress them to a point of reduction within the range of elasticity of the metal. While it is preferred to have the sections of the bush actually united by the junction-pieces, the said pieces may be on one side only of each section, or they may be on both sides and the pieces separated centrally.

In the further description of my said invention, which follows, reference is made to the accompanying drawings, forming a part hereof, and in which—

Figure I is a sectional view of a pulley with a tapering central hole. Fig. II is a similar view of the pulley with a bush shown therein. Figs. III to XII, inclusive, are views of bushes illustrating various methods of arranging the sections thereof, as hereinafter fully described.

Similar letters of reference indicate similar parts in all the views.

A, B, and C represent, respectively, the rim, arms, and hub of the pulley. The hub C is formed with a tapering central hole by means of a sand or metallic core.

D is the tapering bush, which is constructed with the same taper as the central hole in the hub, and of such diameter as will require some force to adjust it properly in the hub. The bush D is cast slotted, or in sections, and furnished with the junction-pieces *a*, which separate the sections, as shown. After the bush, when the same is in separate sections, is bored, it is marked to its place in the pulley-hub, and the bush then removed, and the junction-pieces slightly reduced in thickness, in order that the bush may properly clamp the shaft.

It is preferred to bore the bush somewhat smaller than the shaft, in which case the bush can be used without reducing the junction-pieces.

Bushes can be made with the junction-pieces of some material more easily compressed than iron—such as wood.

It will be understood that, instead of driving into the pulley a mandrel upon which to turn it, as is commonly practiced, the pulley may be secured to the mandrel by means of my improved bushes, as before described.

I claim as my invention—

1. In combination with a pulley or wheel, a tapering bush adapted for insertion in the hub, the said bush being in sections united by junction-pieces, substantially as specified.

2. A tapering bush for reducing the diameter of the central hole in a pulley or gear wheel, formed in sections, united by junction-pieces, substantially as specified.

JOHN WALKER.

Witnesses:
 THOS. S. COOK,
 GEO. W. GARDNER.